H. Strater Jr.,
Beer Pump.
N°38,250. Patented Apr. 21, 1863.
Fig. 3.
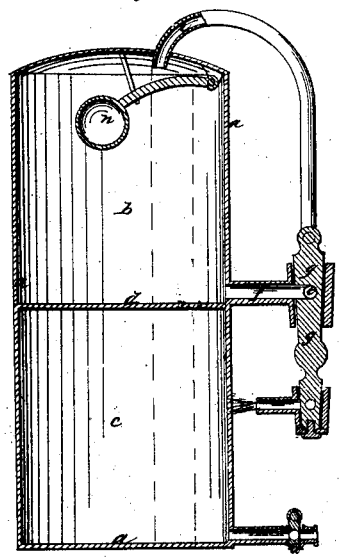
Fig. 2.
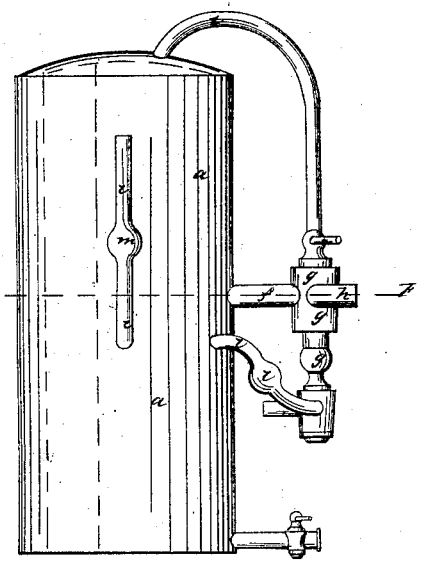
Fig. 4.
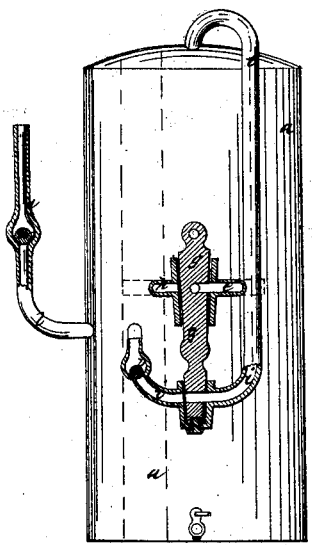
Fig. 5.
Fig. 1.
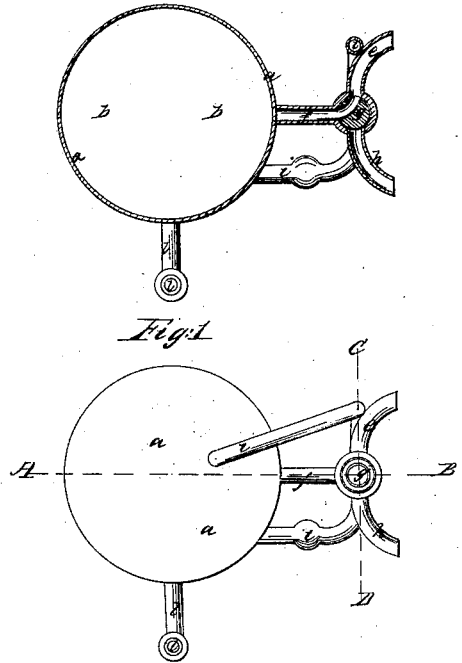
Witnesses.
Joseph Gavett
Albert W. Brown
Inventor.
Herman Strater Jr.

UNITED STATES PATENT OFFICE.

HERMAN STRATER, JR., OF ROXBURY, MASSACHUSETTS.

IMPROVEMENT IN AIR-CONDENSING APPARATUS FOR FORCING LIQUIDS.

Specification forming part of Letters Patent No. 38,250, dated April 21, 1863.

*To all whom it may concern:*

Be it known that I, HERMAN STRATER, Jr., of Roxbury, in the county of Norfolk and State of Massachusetts, have invented certain new and useful improvements in apparatus for condensing air and retaining it under pressure for the purpose of forcing beer or other liquids; and I do hereby declare that the following description, taken in connection with the accompanying drawings, hereinafter referred to, forms a full and exact specification of the same, wherein I have set forth the nature and principles of my said improvements, whereby my invention may be distinguished from all others of a similar class, together with such parts as I claim and desire to have secured to me by Letters Patent.

The present invention consists in a new apparatus for condensing air and retaining the same under the pressure ready for use. Its most essential features are a reservoir supplied with water and air, a receptacle for containing this air when compressed, and a suitable arrangement of induction and eduction passages and valves for the reception and delivery of the water and air to their proper localities and at the suitable times.

The object of these improvements is to obviate the defects and inconvenience of the pumps and the other apparatus commonly employed for similar purposes.

In the accompanying drawings my improvements are represented.

Figure 1 is a plan or top view. Fig. 2 is a side view. Fig. 3 is a central longitudinal vertical section in plane of line A B, Fig. 1; Fig. 4, a vertical section in plane of line C D, Fig. 1; Fig. 5, a horizontal section in plane of line E F, Fig. 2.

*a a a a* in the drawings represent a cylindrical vessel containing two compartments, *b* and *c*, separated by a partition, *d*. Into the upper one, *b*, of these compartments water is admitted or forced through a main passage, *e e*, and pipe *f f* by means of a two-way cock, *g*. By turning the two-way cock *g* into the opposite position from that represented in Fig. 5, the supply of water will be shut off and air admitted through the passage *h*.

The operation of the apparatus is as follows: The reservoir *b* being first filled with air through the passage *h*, the two-way cock *g* is turned so as to close this passage and open the water-passage *e e*, through which the water flows into the compartment *b*, compressing the air therein and forcing it through a pipe, *i i*, into the lower compartment, *c*, which thus soon becomes filled with compressed air, a ball-valve, *k*, or any other suitable device, serving to prevent the return of the air to the compartment *b* in case of back-pressure. From the reservoir *c* the compressed air is delivered as desired into the vessel containing the liquid to be forced out or delivered through a pipe, *l*, containing a valve, *m*, which allows the free passage of the compressed air, but prevents the back-flow of the liquid, as will readily be understood by inspection of Fig. 4. When the compartment *b* has become filled with water, and consequently the air therein exhausted, a floating valve, *n*, closes the orifice of the pipe *i i*, when the water can be discharged by means of the two-way cock *g*, which is to be turned in such a manner as to open the passage *h*, which allows the water to escape. When the compartment thus becomes free of water, air will pass in through the passage *h* to the compartment *b*, where water is again forced into the same by turning the cock *g*, so as to shut the passage *h* and open the water-passage *e e*.

A gage may be attached to the apparatus to indicate the amount of pressure in the same, so as to regulate the supply of water and air at pleasure.

It will be evident that the compartments *b* and *c*, instead of being contained in one and the same vessel, may consist of two separate reservoirs, distinct from each other, but they must operate together substantially as described.

There are, of course, various other modifications that may be made in the details of construction, but they need not be herein more particularly explained, as they will not vary the essential features of my improvements.

Having thus described my improvements, I shall state my claim as follows:

1. The combination, with the alternate air and water reservoir, in which the air is compressed and displaced by water, of a two-way cock so arranged in relation to a water and air supply pipe as to operate substantially in the manner as hereinbefore set forth.

2. The combination, with the alternate air and water reservoir, in which air at the pressure of the atmosphere is compressed and displaced by water, of an air-receiver, the two being connected by pipes and valves in such manner that the compressed air cannot return to the said reservoir, substantially as set forth.

3. The air and water supply pipe on the alternate air and water reservoir and pipe connecting said reservoir with the air-receiver, in combination with a double cock, the arrangement being such that communication between the reservoir and the air-receiver is established and stopped simultaneously with the admission to and emission from the reservoir of water, substantially as herein set forth.

4. The combination, with the alternate air and water reservoir and air-discharge pipe connecting the same with the air-receiver, of a valve or its equivalent operated by a float, so as to automatically close the said discharge-pipe and stop the supply of water, substantially as hereinbefore shown and described.

HERMAN STRATER, JR.

Witnesses:
JOSEPH GAVETT,
ALBERT W. BROWN.